United States Patent

[11] 3,555,254

| [72] | Inventor | Heinz Joseph Gerber<br>West Hartford, Conn. |
|---|---|---|
| [21] | Appl. No. | 631,532 |
| [22] | Filed | Apr. 17, 1967 |
| [45] | Patented | Jan. 12, 1971 |
| [73] | Assignee | The Gerber Scientific Instrument Company<br>South Windsor, Conn.<br>a corporation of Connecticut |

[54] ERROR CORRECTING SYSTEM AND METHOD FOR USE WITH PLOTTERS, MACHINE TOOLS AND THE LIKE
10 Claims, 1 Drawing Fig.

| [52] | U.S. Cl. | 235/151.11,<br>318/162, 318/18; 235/153 |
|---|---|---|
| [51] | Int. Cl. | G05b 19/18 |
| [50] | Field of Search | 235/151.11,<br>151, 151.1; 318/20.530 |

[56] References Cited
UNITED STATES PATENTS

| 2,988,681 | 6/1961 | Bower | 318/28 |
|---|---|---|---|
| 3,149,482 | 9/1964 | Gitlin et al. | 318/20.530X |
| 3,422,325 | 1/1969 | Gerber et al. | 318/20.530X |

*Primary Examiner*—Eugene G. Botz
*Attorney*—McCormick, Paulding and Huber

ABSTRACT: A method and system is provided for positioning a marking instrument, cutting tool or other driven part of a numerically controlled device and for overcoming, in such positioning, repeatable errors due to mechanical limitations such as, for example, lack of perfect straightness in guide ways or lead screws. A memory device forming part of the computer associated with the system is filled with a table of error correction values corresponding to different points or areas in the field of movement of the driven part and as the part is moved to such points or areas corrections are made in accordance with the table of error correction values.

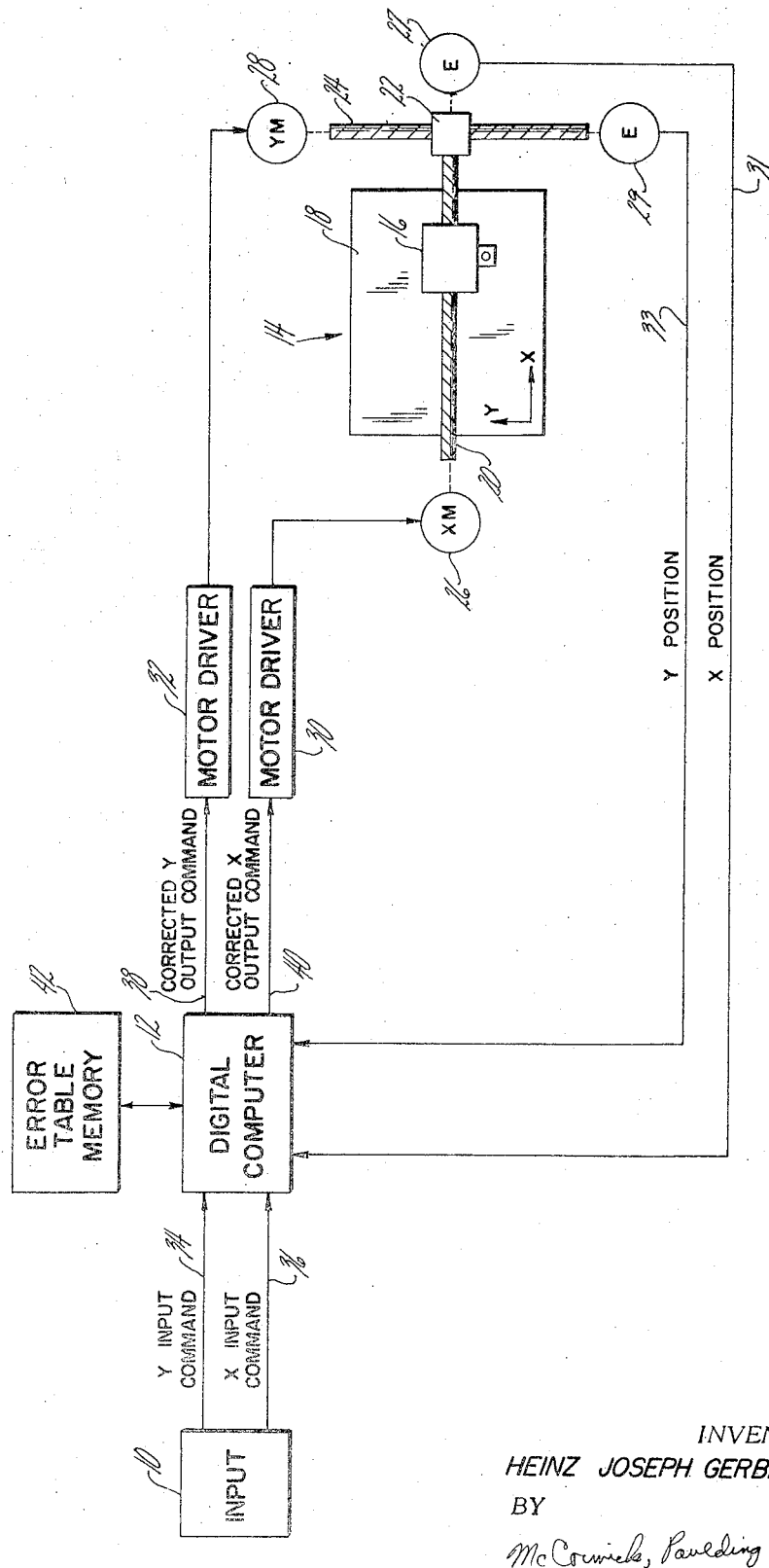

3,555,254

ERROR CORRECTING SYSTEM AND METHOD FOR USE WITH PLOTTERS, MACHINE TOOLS AND THE LIKE

BACKGROUND OF THE INVENTION

This invention relates to numerically controlled devices such as plotters, machine tools or the like for automatically positioning a driven part relative to a reference member in response to coded input commands, and deals more particularly with a system and method useful in such devices for improving their positioning accuracy by overcoming repeatable mechanical errors.

When a mechanical positioning device, such as a plotter or machine tool is manufactured, the accuracy of its mechanical response to input command signals is limited, at least in part, by the accuracy with which various mechanical parts such as guide ways or lead screws are made. Guide ways, for example, are never perfectly straight, and this lack of straightness results in repeatable nonlinearities or errors in the performance of the device. Likewise, the lead screws and other parts of the drive system between the driving motor or motors and the driven part give rise to repeatable errors in the positioning accuracy due to the impossibility of manufacturing such parts to perfect tolerances. There are also some nonrepeatable inaccuracies in all positioning devices caused by hysteresis, dirt, and other factors which cannot be corrected by the method or system of this invention. These nonrepeatable errors, however, are often small in comparison to the repeatable errors so that a significant improvement in the overall positioning accuracy of a device may be made by reducing or eliminating the repeatable errors.

The general aim of this invention is therefore to accomplish an improvement in the accuracy with which a positioning device such as a plotter or machine tool may position a driven part by providing a system and method for overcoming the repeatable mechanical errors present in such a device.

SUMMARY OF THE INVENTION

This invention involves a system for positioning a driven part in a numerically controlled positioning device including a computer having a memory. In the setting up of the system the driven part is commanded to move to various positions spread over its field of movement and after it reaches each such position its actual position is accurately measured to determine the error between the commanded position and the actual position. The values of the errors thus determined are fed into the memory device to form a table of error values versus part position. Thereafter, as the driven part is moved to different positions relative to the reference member the computer memory is interrogated and error values from the table are used to correct the commands transmitted to the motor drivers to take into account the repeatable error associated with the position of the driven part. The system of the invention includes, in addition to the memory device for storing the error table, an input device for providing position input commands, one or more motors for driving the driven part, and a digital computer for converting the input commands into corrected output commands transmitted to the motors, said output commands being corrected by values of error extracted from said computer memory in accordance with the position of the part.

BRIEF DESCRIPTION OF THE DRAWING

The drawing shows in schematic block diagram form a system embodying this invention as applied to an X-Y plotter.

DESCRIPTION OF THE PREFERRED EMBODIMENT

A part positioning system embodying the present invention and applied particularly to an X-Y plotter is shown by way of example in the drawing. Referring to the drawing, the illustrated system includes an input device 10, a digital computer 12 and an X-Y plotter indicated generally at 14. The plotter 14 includes a driven part 16, such as a pen carriage, print head or the like, which is movable to any point over a reference member consisting of a sheet 18 of paper or the like fixed to the bed of the plotter. Movement of the driven part 16 along one axis, referred to as to the X axis, relative to the sheet 18 is effected by a lead screw 20. The lead screw 20 is in turn carried by a carriage 22 which is movable along another axis, referred to as the Y axis, relative to the paper 18 by another lead screw 24. The lead screw 20 is driven by an associated motor 26 and the lead screw 24 is driven by an associated motor 28. Each of the motors 26 and 28 may be individual motors or groups of motors suitably drivingly connected. Each of the motors 26 and 28 is preferably, although not necessarily, a stepping motor the energization of which is controlled by an associated motor driver 30 or 32. Drivingly connected with the lead screw 20 is an encoder 27 which through the line 31 transmits signals to the computer 12 representing the position of the part 16 along the X axis as determined by the angular position of the lead screw 20. Likewise an encoder 29 is drivingly connected with the lead screw 24 and transmits signals to the computer through the line 31 representing the position of the part 16 along the Y axis as determined by the angular position of the lead screw 29.

The input device 10 may take various different forms, and may, for example, consist that a punched paper tape reader, magnetic tape reader, or an "onstream" data generating device. It in any event serves to provide the computer 12 with input commands, generally in coded numerical form, representing positions to which the driven part 16 is to be moved. A Y input command representing the position to which the part is to be moved along the Y axis is supplied on the line 34, and an X input command representing the position to which the part is to be moved along the X axis is provided on the line 36. The computer 12 in turn operates to convert the input commands on the lines 34 and 36 to output commands transmitted to the motor drivers 32 and 30, respectively, the output command for the Y axis motor driver 32 being supplied on the line 38 and the output command for the X motor driver 30 being supplied on the line 40. In the case where the motors 26 and 28 are stepping motors the commands on each of the lines 38 and 40 consist of electrical pulses with each pulse representing one change in the state of energization of the associated stepping motor and one increment of movement of the driven part 16 along the associated axis.

Associated with the computer 12 is a memory device 42 which is charged with a table of error values versus part or reference positions. These error values are in turn related to the amounts by which the position of the driven part has to be corrected at each reference point, in order to cause such position to coincide with or at least move closer to the commanded position, when the computer is operated without using such error values. The computer 12 is in turn programmed so as to extract error values from the memory device 42 in accordance with its position and to use the same to correct the output commands appearing on the lines 38 and 40 so as to reduce the error which would otherwise be present in the positioning of the driven part 16.

The error value versus reference position table which is stored in the memory device 42 may be made by using accurate measuring means, such as a laser interferometer, to determine the true position of the driven part relative to the sheet 18 or other reference member. The driven part is commanded through a number of reference positions spread over its field of movement by input commands supplied by the input means 10. As the driven part reaches each supposed reference position its true position is measured and compared with the commanded position to obtain the error value or values for such reference position. By driving the driven part through a grid of positions spread over the entire area of the reference member 13 error values may be obtained on a two axis basis, with an X error value and a Y error value associated with each reference point. From this an error table is set up which actually represents a family of correction curves, the error values associated with each reference point being dependent on, or a function of, the position of the driven part 16 along both of its axes of movement.

The error table contained in the memory device 42 may be generated automatically under computer program control utilizing inputs to the computer from the measuring equipment for determining the true position of the driven part and comparing these inputs with the commanded positions from the input device 10 to determine the error values which are then automatically transmitted to the memory device 42. The table may also be made manually if the number of reference points is not too large. For a two axis device such as the plotter 14 a grid or matrix of reference points is preferably established at fixed grid intervals along each axis. For example, a grid of lines on the X and Y axes spaced one inch apart would have 100 intersections or reference points for a 10 inch by 10 inch area. An error table for this size of area and interval distance may be manually calculated, but for larger areas and/or smaller intervals the number of intersections becomes quite large and the generation of the table by automatic means is preferred.

As an alternative to constructing an error table based on a grid of reference points spread over the entire area of the field of movement of the driven part, the error table in many cases may be simplified and based on error values obtained by taking error readings at a number of reference points spaced from one another on a single line along each axis. This alternative technique is adaptable to positioning devices, such as many plotters, which utilize guideways and lead screws to operate and control the positioning of the driven part. These devices characteristically have repeatable positioning errors along each axis a major portion of which are due to repeatable nonlinearities in the lead screw and guideways. These repeatable nonlinearities due to the lead screw and guideways are in turn not dependent on the position of the driven part relative to the other axis, and therefore for each axis only one set of error readings along the axis need be taken. In the case of the previously described 10 inch by 10 inch area with one inch intervals between the reference points, the number of reference points is by this method reduced to 10 reference points along one axis and 10 reference points along the other axis for a total of 20 reference points. This method therefore considerably reduces the number of measurements required, reduces the time and labor required for developing the error table, reduces the amount of memory capability required by the memory device 42 and reduces the computation time and complexity of the computer program.

In operating the system shown in the drawing with the use of the error table stored in the memory device 42 the computer 12 may be programmed in various different manners to make use of the error values. In accordance with one method of operation the computer 12 may be programmed to make error corrections in a discrete fashion as the driven part 16 passes given reference points. That is, as the driven part passes a reference point an error correction is made in accordance with the error value stored in the memory 42 for such reference point, the whole extent of the correction being made at one time. As an alternative to this the computer may be programmed to interpolate the error correction required for any position of the driven part 16 from the error values associated with adjacent reference points and to progressively or proportionally make error corrections in accordance with such interpolated values as the driven part is moved between reference points.

Where the drive motors of the positioning device are stepping motors the output commands from the computer appearing on the lines 38 and 40 consist of electrical pulses and the corrections effected by the computer through the use of the error table consists essentially of adding or subtracting pulses to the pulse trains which would otherwise appear on the lines 38 and 40. Where the computer is programmed to make corrections in a discrete fashion a number of pulses related to the magnitude of the error value are added to or subtracted from the lines 38 and 40 as each reference position is reached. Where the computer is programmed to interpolate the error values single pulses are added or subtracted from the lines 38 and 40 in a proportional manner. That is, the space between two reference points along the axis in question is divided into increments, with the number of such increments depending on the error values at the reference points, and one pulse is added or subtracted as the driven part reaches the end of each increment.

It should be understood that the embodiment of the invention shown in the drawing and described above is intended to be exemplary only, that various changes may be made from the construction disclosed and that the drawings and description are not to be construed as defining or limiting the scope of the invention, the claims forming a part of the specification being relied upon for that purpose. In particular, it should be understood that the drive motors used in the part positioning device, such as the motors 26 and 28, need not be stepping motors and could instead be servomotors. In this case the corrected output commands supplied to the motor drivers 32 and 30 over the lines 38 and 40 may be digital commands generally similar to those supplied to the computer 12 by the input device 10 over the lines 34 and 36 but corrected by the computer 12 through the use of the error table in the memory 42. The motor drivers 30 and 32 would also then constitute devices for converting the digital commands on the lines 38 and 42 into suitable signals for driving the motors 26 and 28.

I claim:

1. A method for reducing errors in a device for positioning a driven part relative to a reference member and including a computer for converting input commands into output commands having arguments related to the positions to which said driven part is to be moved, said method comprising the steps of storing a table of error values versus reference positions in a memory device associated with said computer, and thereafter operating said computer in accordance with such a program that as said driven part is moved to different points of its field of movement as a result of input commands supplied to said computer said memory device is interrogated and values of error corresponding to said points are extracted therefrom and used to correct said output commands.

2. The method as defined in claim 1 further characterized by said step of operating said computer including the use of such a program that said error values obtained from said memory are used to effect discrete changes in said output commands as said driven part passes the various reference positions included in said table.

3. The method as defined in claim 1 further characterized by said step of operating said computer including the use of such a program that at any position of said driven part the amount of error correction required in said output commands is interpolated from the error values given by said table for adjacent reference positions and so that corrections are made in accordance with such interpolated error values as said driven part is moved between various reference positions included in said table.

4. A method for reducing errors in a device for positioning a driven part relative to a reference member and including a computer for converting input commands into output commands having arguments related to the positions to which said driven part is to be moved, said method comprising the steps of providing input commands to said computer commanding movement of said driven part to different reference positions spread over its field of movement, accurately measuring the actual positions of said driven part after it supposedly reaches each of said different reference positions and from such measurements calculating the values of the errors between the positions commanded by said input commands and the measured positions to obtain a table of error values versus reference positions, inserting said table of error values versus reference positions into a memory device associated with said computer, and thereafter operating said computer in accordance with such a program that as said driven part is moved to different points of its field of movement as a result of input commands supplied to said computer said memory device is interrogated and values of error corresponding to said points are extracted therefrom and used by said computer to correct said output commands.

5. The method as defined in claim 4 as used with a positioning device wherein said driven part is independently movable along two axes so as to be capable of being moved to any point on a given area of said reference member, said method being further characterized by said step for providing input commands to said computer commanding movement of said driven part to different reference positions spread over its field of movement consisting of providing input signals to said computer commanding movement of said driven part through a number of reference points spaced along one of said axes by given intervals and a number of reference points spaced along the other of said axes by given intervals, and by setting up said table of error values so as to have for each axis a single error value for each reference point along such axis.

6. The method as defined in claim 4 as used with a positioning device wherein said driven part is independently movable along two axes so as to be capable of being moved to any point on a given area of said reference member, said method being further characterized by said step of providing input commands to said computer commanding movement of said driven part to different positions spread over its field of movement consisting of providing input signals to said computer commanding movement of said driven part through a grid of reference positions separated from one another along both of said axes by given intervals and spread generally over the entire extent of said given area of said reference member, and by setting up said table of error values so as to have for each of said reference positions an associated error value for each of said two axes with the result that the error values supplied by said memory device are dependent on the position of said driven part along both of said axes.

7. In a part positioning system for moving a part relative to a given reference member, the combination comprising a memory device having stored therein a table of error values versus part positions, a drive system for said driven part operable to move said driven part to different positions relative to said reference member in response to input commands thereto, means providing primary input commands commanding movement of said driven part to various driven positions, and a computer operable to convert said primary input commands into input commands transmitted to said drive system, said computer including means for interrogating said memory device to obtain therefrom error values corresponding to the position of said driven part and for using the error value so obtained to correct said input commands transmitted to said drive system.

8. The combination defined in claim 7 further characterized by said drive system including a stepping motor for driving said driven part, and a driver for said stepping motor, said input commands transmitted to said drive system consisting of electrical pulses transmitted to said driven, and said computer including means for adding pulses to or subtracting pulses from said input commands in accordance with the magnitude and sign of the error values obtained from said memory device.

9. The combination defined in claim 8 further characterized by said means for adding pulses to or subtracting pulses from said input commands including means for performing such an operation in a discrete fashion as said driven part passes given reference positions.

10. The combination defined in claim 8 further characterized by said means for adding pulses to or subtracting pulses from said input commands including means for performing such an operation in a proportional manner as said driven part moves between given reference positions.